(12) United States Patent
Kraemer et al.

(10) Patent No.: US 8,014,828 B2
(45) Date of Patent: Sep. 6, 2011

(54) METHOD AND DEVICE FOR TRANSMITTING SIGNALS IN A WIRELESS COMMUNICATION SYSTEM AND METHOD AND DEVICE FOR RECEIVING SIGNALS IN A WIRELESS COMMUNICATION SYSTEM

(75) Inventors: Oliver Kraemer, Ostfildern (DE); Volker Wullich, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 795 days.

(21) Appl. No.: 12/026,818

(22) Filed: Feb. 6, 2008

(65) Prior Publication Data

US 2008/0242251 A1    Oct. 2, 2008

(30) Foreign Application Priority Data

Mar. 29, 2007    (EP) .................................... 07105275

(51) Int. Cl.
*H04M 1/00*    (2006.01)
(52) U.S. Cl. ................... 455/562.1; 455/63.4
(58) Field of Classification Search ............... 455/562.1, 455/35, 63.4
See application file for complete search history.

(56) References Cited

U.S. PATENT DOCUMENTS 3,928,804 A * 12/1975 Schmidt et al. ............... 370/323
7,511,663 B2 * 3/2009 Wang et al. .................... 342/367
7,737,890 B2 * 6/2010 Wang et al. .................... 342/367
2004/0185782 A1 * 9/2004 Halford et al. ............... 455/63.4
2005/0009473 A1 * 1/2005 Ranta et al. ...................... 455/83
2005/0186921 A1 * 8/2005 Hoo et al. ...................... 455/121

FOREIGN PATENT DOCUMENTS

EP    1 659 813 A1    5/2006
WO    2006/031495 A2    3/2006

* cited by examiner

*Primary Examiner* — Lewis West
(74) *Attorney, Agent, or Firm* — Oblon, Spivak, McClelland, Maier & Neustadt, L.L.P.

(57) ABSTRACT

The present invention relates to a transmitting device (1) for transmitting signals in a wireless communication system, wherein said signals are transmitted in consecutive frames (23a, 23b, 23c), each frame comprising a beacon (BSF) and data frames (DF), said transmitting device (1) comprising a first set of narrow beam antennas (2a, 2b, 2c), each narrow beam antenna (2a, 2b, 2c) having a different beaming direction corresponding to one of a number of different transmission paths ($P_0$, $P_1$, $P_2$) from said transmitting device (1) to a receiving device, and a first control means (5) adapted to control the transmission of said frames (23a, 23b, 23c), whereby the data frames (DF) of respectively two consecutive frames (23a, 23b, 23c) are transmitted via different narrow beam antennas (2a, 2b, 2c).

The present invention further relates to a receiving device (10) for receiving signals in a wireless communications system as well as to a method for transmitting signals in a wireless communications system and to a method for receiving signals in a wireless communication system.

33 Claims, 8 Drawing Sheets

METHOD AND DEVICE FOR TRANSMITTING SIGNALS IN A WIRELESS COMMUNICATION SYSTEM AND METHOD AND DEVICE FOR RECEIVING SIGNALS IN A WIRELESS COMMUNICATION SYSTEM

BACKGROUND OF THE INVENTION

Field of the Invention

The present invention relates to a transmitting device for transmitting signals in a wireless communication system, to a receiving device for receiving signals in a wireless communication system, to a method for transmitting signals in a wireless communication system as well as to a method for receiving signals in a wireless modifying the packet with the determined routing modification. communication system.

DISCUSSION OF THE BACKGROUND

Wireless communication is used in a large variety of technical fields, such as mobile telephones, wireless LAN, broadcast radio systems, point-to-point radio systems and many other known and future applications. The communication radius covered by a respective wireless communication system basically depends on the technique used. Whereas cellular communication systems, such as the GSM and the UMTS system, are adapted for a communication radius up to about 10 km (or more), wireless LAN is in the range of about 100 m (or more) and the Bluetooth system is in the range of several 10 m (or more). The mayor influences on the communication range of a wireless communication system are the radio frequency and the output power used. Although only little absorption of electromagnetic waves in the atmosphere occurs at the radio frequency used for GSM and UMTS, a significant absorption occurs in the 60 GHz range, which makes it quite well suited for low range and indoor wireless communication. Furthermore, the kind of transmission and/or reception antenna that is used for a respective wireless communication technique is depending on a respective field of application.

Generally, between a transmitter and a receiver there exist several transmission paths depending on the number of antennas. In case that the direct line of sight (LOS) path is blocked by an obstacle, such as a moving human being, a vehicle or the like, there still exist several reflection paths between the transmitter and the receiver, i.e. transmission paths in which the transmitted electromagnetic wave is reflected at least once by objects before it reaches the receiver.

In the state of art therefore for the transmitter, the receiver or for both several narrow beam antennas are used. An example for such a communication system is shown in FIG. 1a. The shown communication system comprises a transmitter 20 and a receiver 21. As shown in FIG. 1a, the transmitter comprises three narrow beam antennas 25a, 25b and 25c and the receiver 21 as well comprises three narrow beam antennas 26a, 26b and 26c. As already mentioned, it is also possible that either the transmitter 20 or the receiver 21 comprises a single wide beam antenna. As shown in FIG. 1a, for a communication between the transmitter 20 and the receiver 21 three possible transmission paths are selected, whereby a first transmission path $P_0$ is the line of sight path and two other paths $P_1$ and $P_2$ are none line of sight paths, in which the transmitted electromagnetic wave is reflected by objects 22. According to the state of art before starting a communication the transmitter 20 and the receiver 21 negotiate several transmission paths out of the whole number of transmission paths that are usable for a communication. The communication then is started over the transmission path having the best transmission characteristics. In the example as shown in FIG. 1a, the direct line of sight path $P_0$ has the best characteristics and therefore the data frames 23a, 23b and 23c are transmitted over this path. The communication goes then on over the selected path until due to any reason, e.g. a moving human being, a vehicle or the like, the actual used transmission path gets blocked. In this case, the communication is then switched to a further path, for example to path $P_1$.

The problem that arises with the shown state of the art communication system is shown in FIG. 1b. The shown communication system again comprises a transmitter 20 and a receiver 21 each having several narrow beam antennas 25a, 25b, 25c, 26a, 26b and 26c. After negotiating the path that can be used for transmission the communication is started with the transmission of the first data frame 23a via the active path $P_0$. In case that an obstacle 24 blocks the actual transmission path $P_0$ at least some of the further data frames 23b, 23c will get blocked by the obstacle and will not arrive at the receiver 21. In case that such a blocking of the active path is detected, in the conventional communication system the communication will then switch to another path $P_1$ or $P_2$.

The disadvantage of such systems is its reactive nature. These systems use the line of sight path $P_0$ until the path quality degrades, and subsequently switch to another none line of sight path $P_1$ or $P_2$. Due to the latency involved in finding another path and switching the antenna, a significant amount of data may be lost.

It is therefore an object of the present invention to provide a transmitting device, a receiving device and a method for transmitting and receiving signals in a wireless communication system that reduces the possible loss of data through the switching process.

This object is solved by a transmitting device according to claim 1, by a receiving device according to claim 9, by a transmitting method according to claim 18 and by a receiving method according to claim 26.

BRIEF SUMMARY OF THE INVENTION

According to the present invention a transmitting device is provided for transmitting signals in a wireless communication system, wherein said signals are transmitted in consecutive frames, each frame comprising a beacon and data frames, said transmitting device comprising a first set of narrow beam antennas, each narrow beam antenna having a different beaming direction corresponding to one of a number of different transmission paths from said transmitting device to a receiving device, and a first control means adapted to control the transmission of said frames, whereby the data frames of respectively two consecutive frames are transmitted via different narrow beam antennas.

Further, according to the present invention a receiving device is provided for receiving signals in a wireless communication system, wherein said signals are received in consecutive frames, each frame comprising a beacon and data frames, said receiving device comprising a second set of narrow beam antennas, each narrow beam antenna having a different beaming direction corresponding to one of a number of different transmission paths from a transmitting device to said receiving device, and a second control means adapted to control the reception of said frames, whereby the data frames of respectively two consecutive frames are received via different narrow beam antennas.

According to the present invention a method is provided for transmitting signals in a wireless communication system, wherein said signals are transmitted in consecutive frames, each frame comprising a beacon and data frames, said transmitting method comprising the steps of providing a first set of narrow beam antennas, each narrow beam antenna having a different beaming direction corresponding to one of a number of different transmission paths from a transmitting device to a receiving device, and transmitting the data frames of respectively two consecutive frames via different narrow beam antennas.

Further, according to the present invention a method is provided for receiving signals in a wireless communication system, wherein said signals are received in consecutive frames, each frame comprising a beacon and data frames, said receiving method comprising the steps of providing a second set of narrow beam antennas, each narrow beam antenna having a different beaming direction corresponding to one of a number of different transmission paths from a transmitting device to a receiving device, and receiving the data frames of respectively two consecutive frames via different narrow beam antennas.

By transmitting/receiving data frames of consecutive frames via different narrow beam antennas and thereby via different transmission paths, the possibility that frames get lost is decreased as this specific transmission/reception algorithm switches the transmission path before an obstacle within the transmission blocks the transmission/reception.

Preferably, a beacon generator generates the beacon for estimating the path quality.

Preferably, a first memory is adapted to store a list of paths that can be used as transmission paths.

Advantageously, the first control means updates the path list stored in the first memory depending on a change of the path quality.

Further, advantageously, the first control means removes a path with a decreased path quality from the path list stored in the first memory.

Preferably, the first control means adds a path with an increased path quality to the path list stored in the first memory.

Preferably, the beacon and the data frames of a frame are sent via different narrow beam antennas.

Advantageously, at least one additional beacon is sent between two frames.

Preferably, a path estimator estimates the path quality based on the received beacon.

Preferably, a second memory is adapted to store a list of paths that can be used as transmission paths.

Advantageously, the second control means updates the path list stored in the second memory depending on a change of the path quality.

Further, advantageously, the second control means removes a path with a decreased path quality from the path list stored in the second memory.

Preferably, the second control means adds a path with an increased path quality to the path list stored in the second memory.

Advantageously, the beacon and the frames of a frame are received via different narrow beam antennas.

Preferably, at least one additional beacon is received between two frames.

It is to be noted that the present invention can be applied to any kind of wireless communication system which enables the transmission and reception of signals over any kind of range. Further, the present invention is not restricted to any kind of modulation schemes or technical implementation of the wireless communication. Some embodiments and implementations of the present invention, however, might be advantageous in short and/or midrange wireless communication systems in which signals are transmitted in the millimeter wave range, as e.g. the 60 GHz transmission range. Further, the transmitting device and the receiving device of the present invention can be any kind of device adapted to transmit and receive, respectively, signals in a wireless communication system. The terms "transmitting device" and "receiving device" are hereby intended to comprise any kind of portable and/or stationary communication equipment, unit, means, system and so forth. The signals to be transmitted from the transmitting device to the receiving device according to the present invention may comprise any kind of information, data, symbols and so forth which can be transmitted from a transmitter to a receiver for any kind of reason and utility. According to the present invention, at least one of the transmitting device and the receiving device comprises at least two narrow beam antennas. In some implementations, it might be preferable that a transmitting device and a receiving device comprise a narrow beam antenna which is adapted to be steered to different positions. The term "narrow beam antenna" is hereby intended to comprise and cover all kinds of antennas which, in contrary to omni-directional antennas which do not have a specific transmission and/or reception direction, have a specific transmission and/or reception direction without any limitation of the specific shape of the antenna beam. Further, the narrow beam antenna of the present invention is not restricted to any specific steering type, i.e. the specific technical implementation which enables the steering or a switching of the narrow beam antenna to different beaming directions as long as the transmitting and/or receiving direction of the narrow beam antenna can be changed, switched, varied and the like. For example, but not exclusively, a narrow beam antenna according to the present invention may be an antenna with a fixed narrow beam radiation pattern, which can be varied by mechanically or electrically shifting the antennas so that the beam direction is varied. Further, the narrow beam antenna could be any antenna type which can be steered by changing the phase and/or the gain of the antenna so that the beam direction changes. As a further alternative, the narrow beam antenna could consist of an antenna pattern whereby each of the antenna elements of the antenna pattern has a specific narrow beam antenna direction and the elements can be controlled in a way that the beaming direction of the antenna is changed. Many other examples of steerable narrow beam antennas can be made, which are currently known or which may be developed in the future, but which would fall under the scope of the present invention.

BRIEF DESCRIPTION OF THE DRAWINGS

The present invention will be explained in more detail in the following description of preferred embodiments in relation to the enclosed drawings in which.

DETAILED DESCRIPTION OF THE INVENTION

Figure 1A:
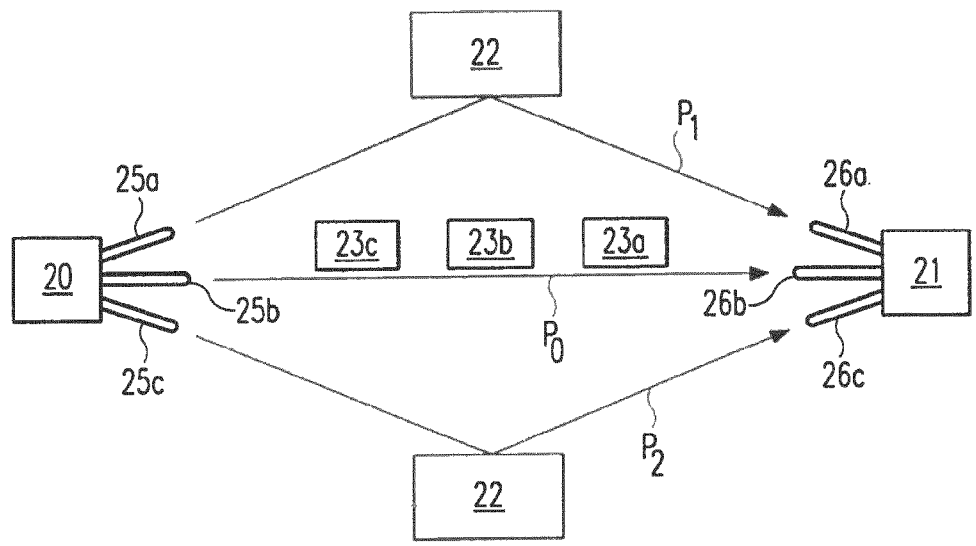
FIGS. 1a and 1b show a communication system according to the state of art, FIG. 2 schematically shows a transmitting device according to the present invention, FIG. 3 schematically shows a receiving device according to the present invention, FIGS. 4a and 4b schematically show a communication system according to the present invention, FIG. 5 schematically shows the possible paths between a transmitting device and a receiving device according to the present invention.
Figure 1B:
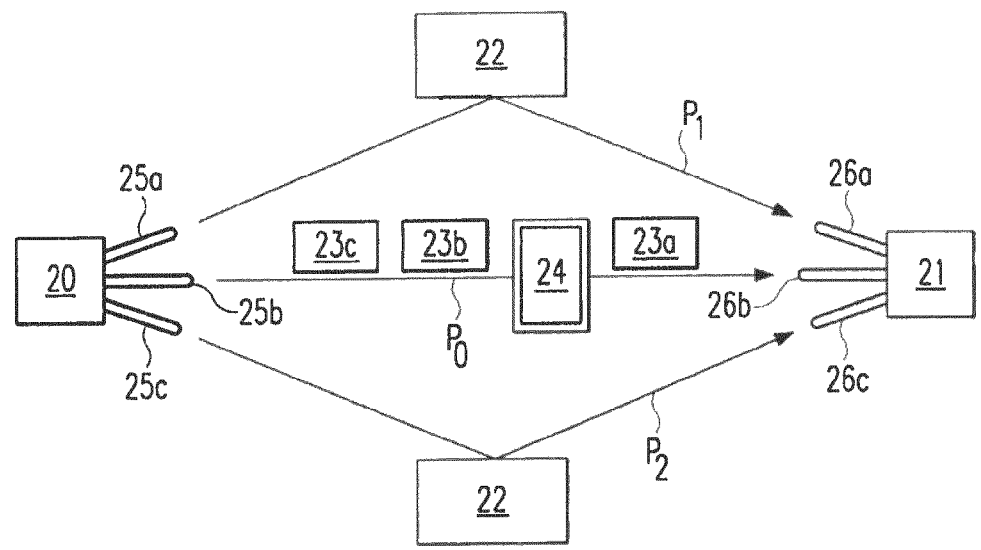
Figure 2:
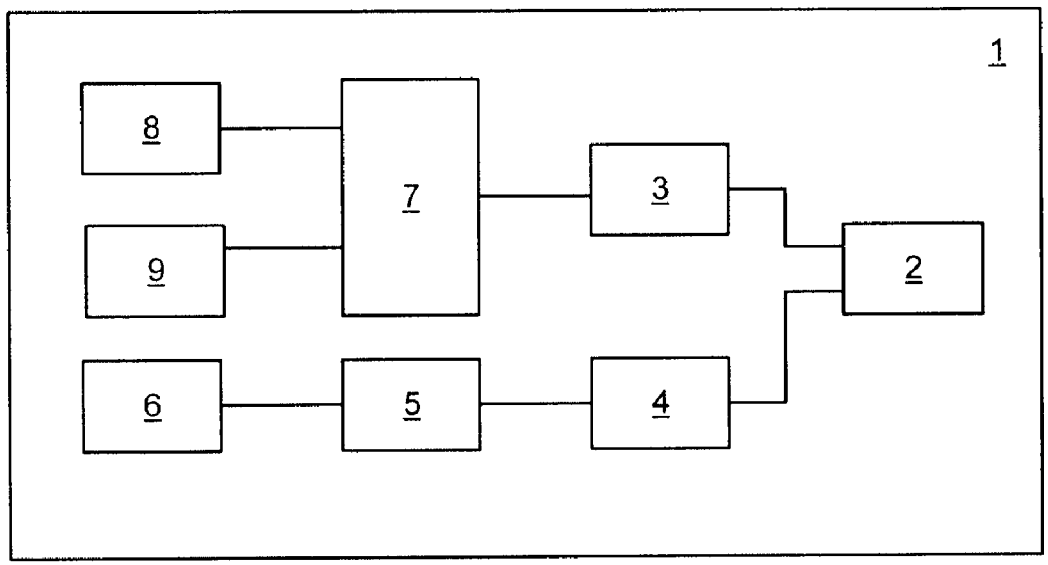

FIG. 2 shows a schematic block diagram of a transmitting device 1 for transmitting signals in a wireless communication system according to the present invention. Hereby, the transmitting device 1 of the present invention as shown in FIG. 2 is only displayed with elements which are necessary for the implementation and the understanding of the present invention. All other necessary elements enabling the transmitting device 1 to transmit signals in a wireless communication system are not shown for the sake of clarity. However, in a practical implementation, all such elements, for example a power supply and the like would be implemented.

The transmitting device 1 comprises a first set 2 of narrow beam antennas which is adapted to allow a transmission of signals into different directions. A first antenna control means 4 is provided which controls the first set 2 of narrow beam antennas either by steering the narrow beam antennas to different positions or by switching between the different narrow beam antennas. The first antenna control means itself is controlled by a first control means 5. The first control means 5 can be a base-stand processing and/or controlling means of the transmitting device 1 or any other suitable control unit. The first control means 5 is connected to a first memory 6 for storing data, information, applications, software codes and so forth.

Figure 7A:
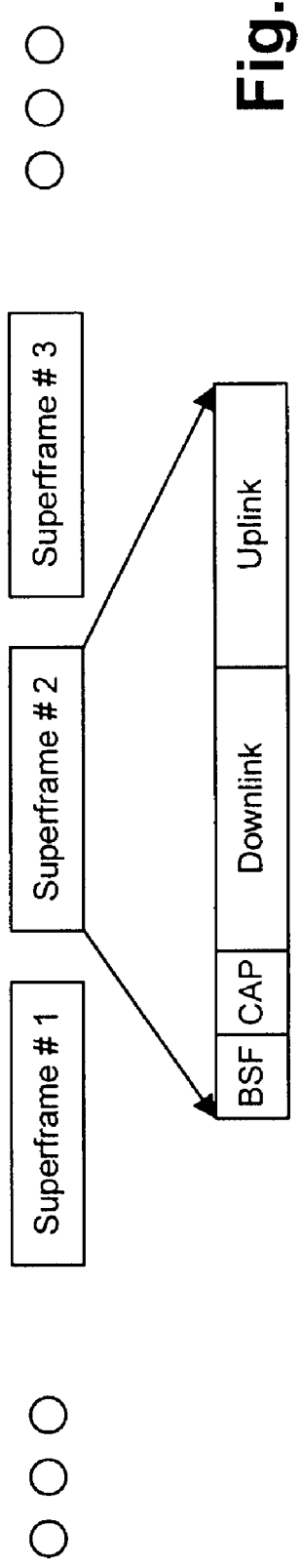
Figure 7B:
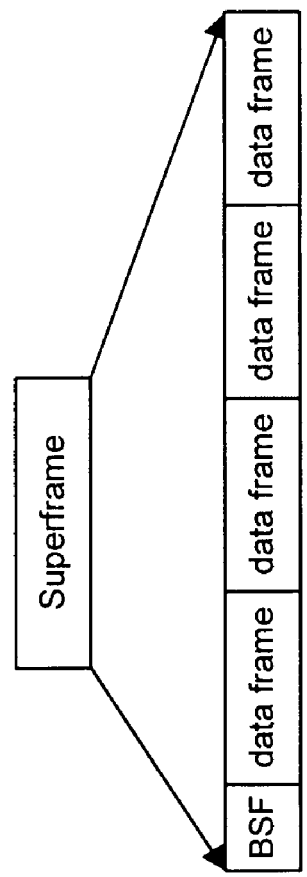

The transmitting device 1 is adapted to transmit signals in consecutive time frames, whereby examples of such frames are shown in FIGS. 7a and 7b and will be explained later. Hereby, it is to be understood that the term "consecutive" does not necessarily mean that the frames are transmitted immediately one after the other. In some implementations there might be an interval between two consecutive frames, which e.g. can be used to handle the clock difference between a transmitting device 1 and a receiving side, such as the receiving device 10 as shown and explained in FIG. 3, in order to support long time and high rate wireless communications, such as wireless high definition television or the like. Amongst other components, the frame comprises a beacon and data frames. Herefore, a beacon generator 9 for generating the beacon and a data means 8 are provided in the transmitting device. The data means 8 generates, collects, or obtains the data in any kind of suitable way and forwards the data to the frame generator 7. The beacon generator 9 also forwards the generated beacon to the frame generator 7 where the frames are formed. After a frame has been generated by the frame generator 7, the generated frames are then further processed in the usual manner, e.g. by modulating the frame information or the like, which are then upconverted and transmitted via first high frequency means 3 through the first set 2 of narrow beam antennas.

Figure 3:
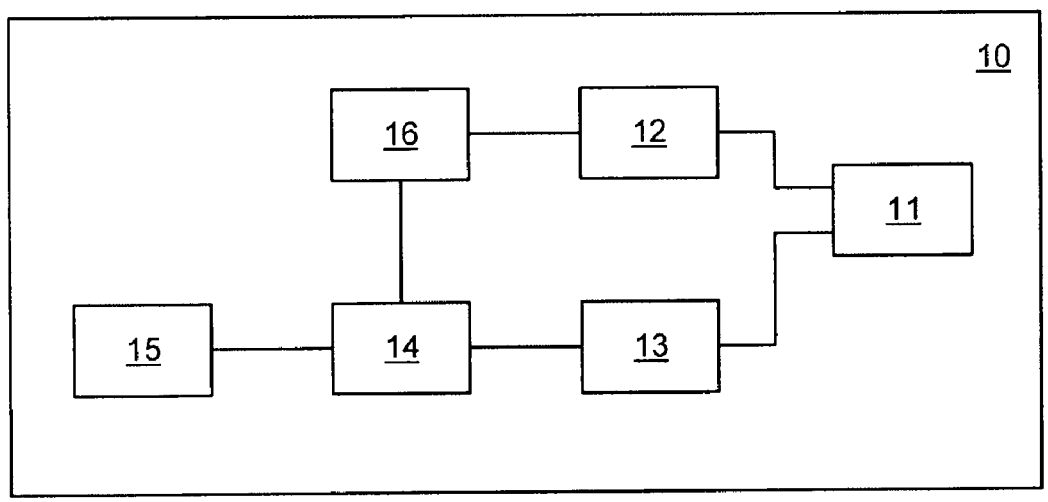

An example of a receiving device 10 for receiving signals in a wireless communication system according to the present invention is schematically shown in the block diagram of FIG. 3. The receiving device 10 comprises a second set 11 of narrow beam antennas which is adapted to receive signals via different transmission paths. A second antenna control means 13 is able to control the beaming direction of the second set 11 of narrow beam antennas either by steering the narrow beam antennas to different positions or by switching between the different narrow beam antennas. The second antenna control means itself is under the control of a second control means 14. The second control 14 can be any kind of suitable control means, such as a base band processing means of the receiving device 10, or any other suitable control and/or processing device. The second control means 14 is connected to second memory 15 adapted to store data, information, applications, software programs and so forth necessary for the operation of the receiving device 10. The receiving device 10 further comprises a second high frequency section 12 which is used to down convert the received signals via the second set 11 of narrow beam antennas, which signals are then further processed in the usual manner in the receiving device 10. In addition, a path estimator 16 is adapted to perform an estimation of the quality of the used path on the basis of the received beacon. The path estimation information derived by the path estimator 16 can e.g. be used in the second control means 14 for changing the beaming direction to a suitable position. It is to be noted that FIG. 3 only shows the necessary elements for understanding the present invention. In a practical implementation the receiving device 10 would comprise all other necessary elements for the operation of the receiving device 10 enabling the reception of signals in a wireless communication system.

Further, it is to be noted that the receiving device 10 also comprises all necessary elements and functionalities to transmit signals in the wireless communication system either via the second set 11 of antennas or a separate transmission antenna. Likewise, the transmitting device 1 comprises all necessary elements and functionalities enabling the reception of the signals in the wireless communication system either via the first set 2 of antennas or a separate reception antenna. Further, the elements and functionalities of the transmitting device 1 shown and explained in relation to FIG. 2 and of the receiving device 10 shown and explained in relation to FIG. 3 could be combined in a communication device enabling the transmission and reception of signals in the wireless communication system.

Figure 4A:
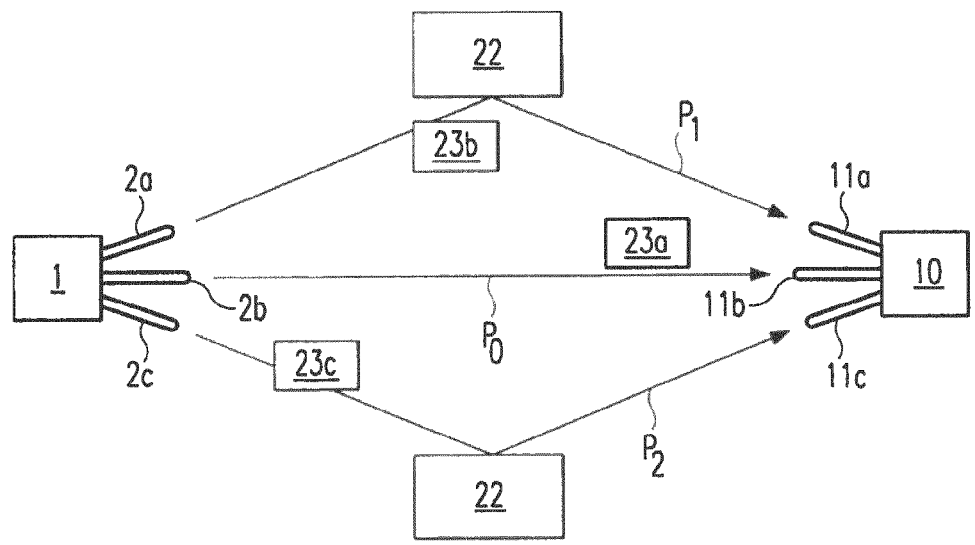
Figure 4B:
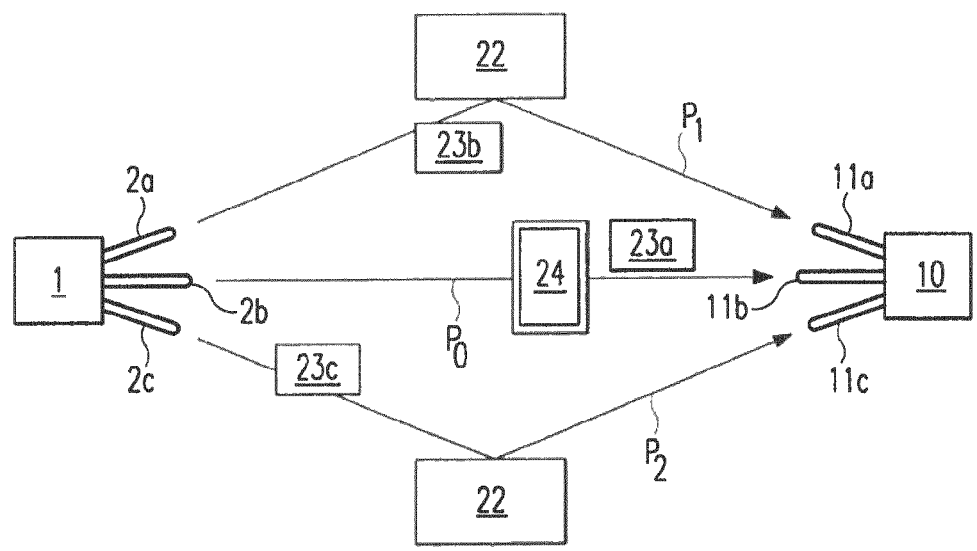

The principle of the present invention will now be explained with reference to FIGS. 4a and 4b. FIGS. 4a and 4b show a communication system comprising a transmitting device 1 and a receiving device 10 according to the present invention. The transmitting device 1 hereby comprises three narrow beam antennas 2a, 2b and 2c each having a different beaming direction. The receiving device 10 as well comprises three narrow beam antennas 11a, 11b and 11c also each having a different beaming direction. Before starting a communication the transmitting device 1 and the receiving device 10 negotiate a transmission scheme comprising a list of transmission paths that can be used for transmission. As shown in the example of FIG. 4a, three transmission paths $P_0$, $P_1$ and $P_2$ can be used for transmission as they each have a good path quality. When transmitting now the different data frames, the transmitting device does not only use one single path but transmits each frame via a different transmission path according to a round robin scheduling. For example, the transmitting device 1 transmits the first frame 23a via the antenna 2b and the transmission path $P_0$ to the receiving device 10. The second frame 23b is then transmitted over the antenna 2a and the transmission path $P_1$ to the antenna 11a of the receiving device 10. The third frame 23c is then transmitted over the third antenna 2c and the path $P_2$ to the receiving device 10.

The advantage of the communication system is shown in FIG. 4a where, as according to the state of art, after the transmission of the first frame 23a an obstacle 24 gets in the way of the line of sight transmission path $P_0$. Due to the round robin scheduling and the transmission of subsequent frames via different transmission paths the second and the third frame 23b and 23c are not transmitted over the blocked path $P_0$ and therefore the possibility that a frame gets lost is decreased.

It is to be noted that the present invention is not limited to a round robin scheduling algorithm but may implement any other path hopping scheme or algorithm that provides the possibility to use different paths for subsequent frames. The order of the used paths can be either repeated or the order can be changed even if not paths are added or deleted from the path list. Additionally or alternatively, one or more paths can be used more often than other paths.

In addition, the present invention proposes to constantly monitor the paths that may be used for a transmission of a data frame. So the transmitting device 1 and the receiving device 10 both hold a list of paths having a good path quality that can be used for transmission. Due to the monitoring of the path of the actual path list it can be detected if either a path out of the actual path list has a decreased quality and should therefore be removed from the path list or if a path that is actually not in the path list has an increased quality and therefore can be also used as a possible transmission path.

According to the present invention the transmission path is changed for subsequent frames in any case and not only in case that the presently used transmission path has a decreased quality. The present invention adopts a pro-active switching of transmission paths. I.e. even if the alternative transmission paths may have a slightly decreased transmission quality they will nevertheless be used for subsequent frames in order to reduce the probability of packet loss due to suddenly blocked beams.

The present invention is carried out by using the MAC protocol. The MAC protocol takes into account the very specific application scenarios of the communication system. The main application scenario is a peer-to-peer connection between a sending and a receiving note. The MAC protocol distinguished two node classes, master and slave devices. In most cases, masters are stationary devices, whereas slaves may be portable devices but in the present invention, masters and slaves in both cases may be portable devices.

Base of the MAC protocol is a super frame as shown in FIG. 7a with a definition of 10 msec. The master indicates the start of a super frame by sending a beacon BSF periodically every 10 msec. The beacon is followed by a contention access period CAP during which nodes which are not known to the master yet can send a registration request. The beacon is sent alternatively via the master's antennas. If a slave nodes response to a beacon, the master knows via which antenna the slave node can be reached initially. After the contention access period CAP follow the downlink and uplink communication slots, where downlink denotes the direction from master to slave, and uplink from slave to master, respectively. Depending on the required transmission rate, the up- and downlink slots can have different lengths, i.e., they do not have to be symmetric.

Either the master or the slave can initiate a connection. If a slave is the originator, it uses the contention access period to send a connection request to the master, which in turn assigns a number of up- and downstream slots to this slave. The upstream slots will be used for communication to the master by the slave from that point onward. In addition to regular super frames, a beacon super frame is sent periodically in which only beacons are sent, but via all different antennas of the master. Thus the slave can determine whether it receives beacons from the master via other paths than the currently active path.

In the present invention with a transmitting device 1 and a receiving device 10 depending on the number of narrow beam antennas, there are several possible communication paths between the transmitting device 1 and the receiving device 10. E.g., if the transmitting device and the receiving device 10 each are equipped with three narrow beam antennas, then there are $3^2=9$ possible communication paths between the devices. It is to be noted that the present invention is not restricted to a number of two or three narrow beam antennas but may implement also more beam antennas for the transmitting device 1 and the receiving device 10. Further, the present invention is not limited to a communication system comprising a transmitting device 1 and a receiving device 10, each having several narrow beam antennas, but is also related to a communication system having either a transmitting device 1 with narrow beam antennas or a receiving device 10 with narrow beam antennas, whereby the respectively other device only has a single wide beam antenna.

For network formation, the master periodically sends beacons in a 10 msec super frame via all antennas. If a slave comes in range, it waits for a sufficient amount of time, i.e., at least 10 msec per antenna before switching to the next antenna. When receiving a signal from the master via the currently selected antenna, it notifies the master through an immediate MAC control message.

FIG. 7b show a simplified block diagram of a frame as transmitted and received in the present invention. The frame hereby comprises a beacon BSF and several data frames. The data frames hereby may be transmitted either from the transmitting device to the receiving device or vice versa. The super frame may also comprise other sequences, such as a contention access period, training sequences, or other preamble sections. For the sake of clarity, in the following description it is only referred to the beacon and the several data frames.

Figure 5:
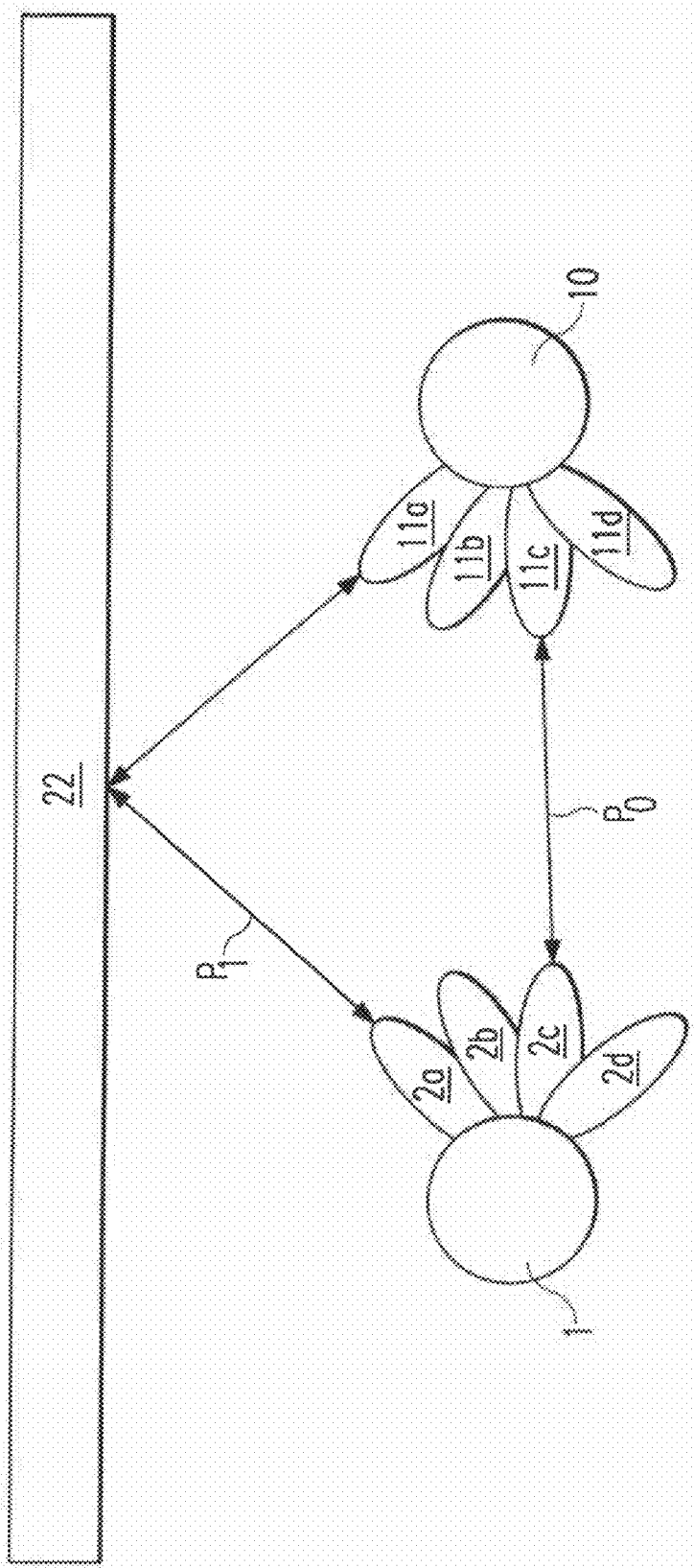

After establishing the communication via one path, the transmitting device 1 and/or the receiving device 10 continue to switch through all available antennas in order to find additional possible transmission paths. This path scanning can be performed while a regular data transmission has already started. FIG. 5 shows an example of the establishing of transmission paths. E.g., the first transmission path $P_0$ is the line of sight transmission path between the antenna 2c of the transmitting device 1 and the antenna 11c of the receiving device 10. The transmitting device 1 will then continue to send out beacons via the other antennas in order to find additional transmission paths. In the example of FIG. 5, an additional transmission path $P_1$, where the electromagnetic wave is reflected by an object 22, is found between the antenna 2a of the transmitting device 1 and the antenna 11a of the receiving device 10. The transmitting device 1 and the receiving device 10 thereby both have a list of possible communication paths, in this case the paths $P_0$ and $P_1$. This list comprises the communication path whose channel quality is high enough for data communication as well as the corresponding antenna beam IDs which has to be utilized to establish the communication link. In case that the possible transmission paths change both lists, i.e., the path list of the transmitting device 1 as well as the path list of the receiving device 10 have to be changed accordingly.

Figure 6:
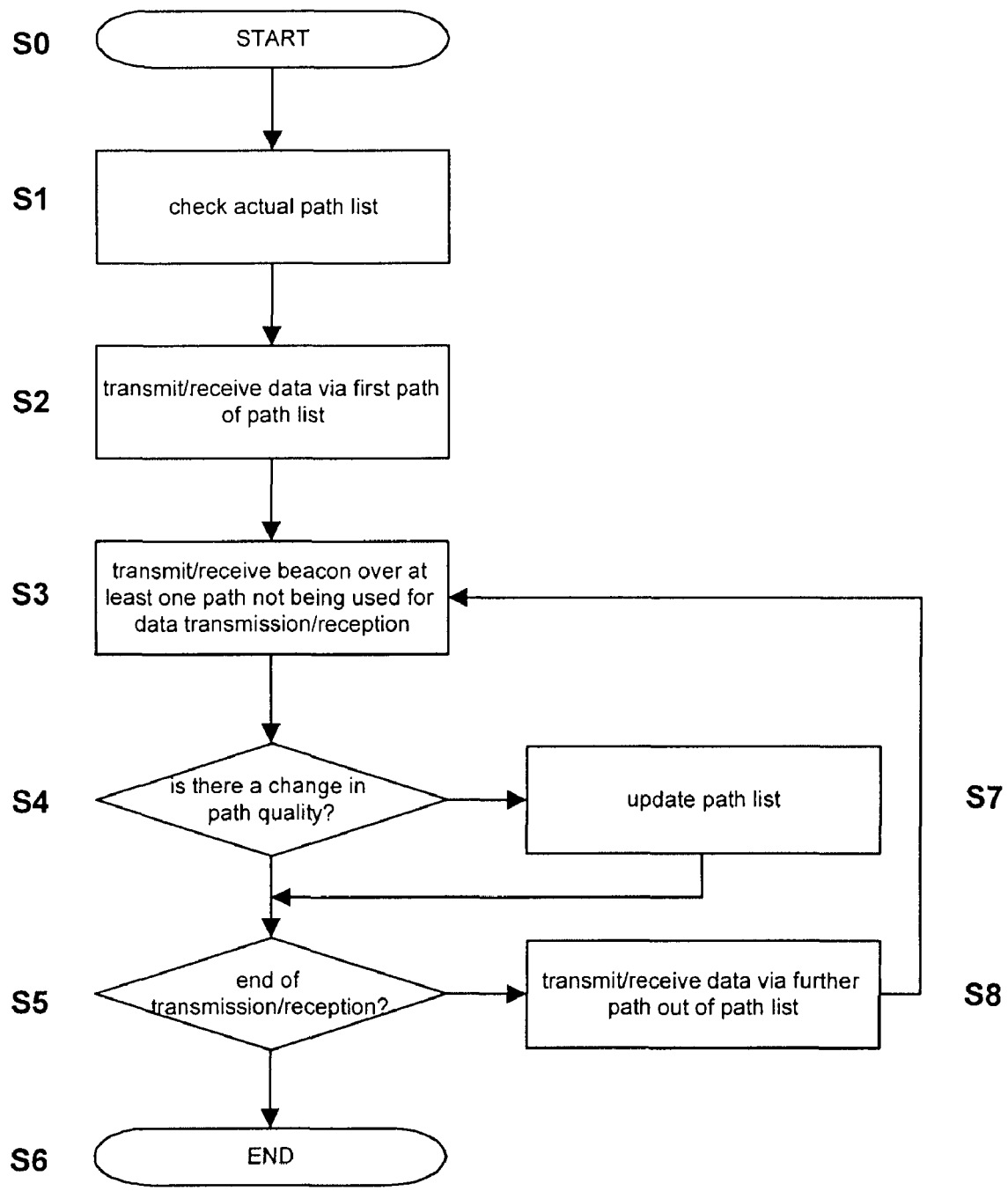
FIG. 6 is a flow chart showing the process according to the method of the present invention, FIGS. 7a and 7b schematically showing the frame structures.

The process according to the present invention is shown in overview by the flow chart of FIG. 6. The process starts in step S0 for example, with an already negotiated list of communication paths as already explained. In step S1, the actual path list is checked. According to the transmission/reception scheme which has been negotiated between the transmitting device 1 and the receiving device 10, in the next step S2, the transmitting device transmits the data frames via the first path out of the path list and/or the receiving device receives data frames via a first path out of the actual path list. In the next step S3 which can also be before the step S2 or at the same time as step S2, a beacon is transmitted and/or received via at least one path that has not been used for the transmission and/or reception of the data in step S2. In the next step S4, it is checked if according to the transmitted and/or received beacon, a change in path quality has been detected. A change in path quality may be either that a path which is comprised in the actual path list is not good enough anymore to be used as a possible communication channel or a change in path quality may also be the case that a path which previously has no good transmission properties and therefore was not used for a possible transmission channel now has an increased channel quality and can be used for a possible transmission path. If a change in path quality in step S4 is detected then in step S7 the path list is updated, i.e., paths of the path list having a decreased quality are removed from the path list and paths not being on the list having an increased channel quality are added to the path list. In any case, either if the path list has not been changed or if the path list in step S7 has been updated, in the next step S5 it is checked if the end of the transmission and/or reception is reached. In case that there are no more data frames that shall be transmitted, the communication ends in step S6. Otherwise, if there is a need of a further transmission of data frames, then the next data frame in step S8 is transmitted and/or received via a further path out of the path list, whereby the path list is either the original path list or the updated path list, and whereby the further path is not the same path as the first one used in step S2. The process then continues with step S3 which may also be concurrently to step S8, where again beacons are sent over the other paths in order to check the channel quality.

As already explained during the transfer of the data frames, the list of useable paths is constantly updated. For this purpose, the MAC protocol uses beacons in its super frames. A super frame starts with a beacon BSF, followed by one or several data frames DF or control frames, all transmitted from the master to the slave. Thereafter the slave transmits its data or control frames to the master. For the data and control frames, the master and the slaves are using the previously negotiated active beam path and the respective antennas allowing a transmission over the selected beam path. For the transmission of the beacon, the master and the slave utilize in every super frame a different antenna beam in order to test the channel quality of this test beam channel. By utilizing this method, the list of usable paths can be updated and at the same time regular data communication is ongoing. When additional paths are found, the master and slave negotiate a path hopping scheme, e.g. a round robin scheduling of the data transmission. Assuming the availability of three paths, only every third frame is transmitted over the same path. If one of those paths is blocked by an obstacle, the probability is 33% that a frame gets lost before the blocked path is removed from the list of active paths. This is only the case if the path gets blocked while transmitting a frame. In general terms, if the master and slave can communicate via n possible paths, the probability that a path gets blocked while or just before transmitting a frame is 1/n.

If characteristics of the paths are known, e.g. through heuristics based on passed measurements, the distribution of the super frame transmission can be adapted accordingly. If, e.g. the line of sight paths becomes more often blocked than the other non line of sight paths, the path hopping scheme may utilize the line of sight less than the other paths, thus decreasing the probability of frame loss even more should the path be blocked.

As already explained, the present invention provides a data transmission via different paths. In addition, the present invention proposes a path monitoring of the quality of the other paths which are not actually used for data transmission. In addition to the round robin scheduling algorithm or to any other path hopping algorithm implemented in the present invention to distribute data frames over all available paths between the transmitting device 1 and the receiving device 10, the transmitting device 1 can while sending a data frame via one path monitor the other known paths to determine the path quality. If the transmitting device 1 based on the feedback of the receiving device determines during these checks that a path got blocked, this path is removed from the path candidate list. Ideally, in this case no data losses occur, since the blocked path will not be used for transmission on the next round. Thus, if the path is blocked while transmitting via another path, the path monitoring that is performed during the transmission will have determined that this path is blocked and the removed the path from the list of paths to be used for transmission.

Specifically, the present invention proposes two embodiments, but is not limited to the presented embodiments.

Figure 8A:
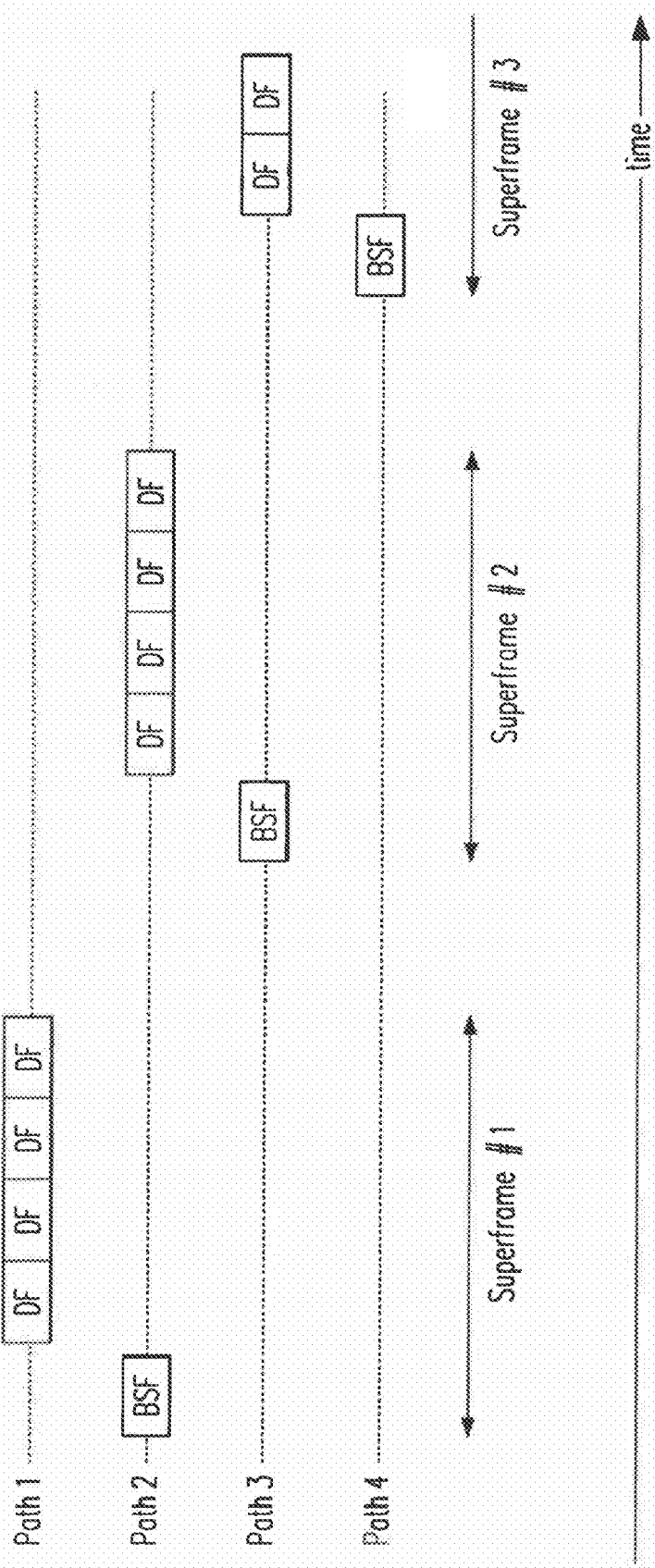
FIG. 8a shows a first embodiment according to the present invention and FIG. 8b shows a second embodiment according to the present invention.

A first embodiment of a path monitoring scheme is shown in FIG. 8a. The time axis is hereby provided from the left to the right. Each line denotes a different path, in the present example four paths are provided. The transmission starts with super frame no. 1. In this super frame, a beacon is sent over path 2 and the transmission of the data frames happens via path 1. That means that path 1 has been negotiated previously as the path having the best channel qualities and therefore the data frame transmission starts with path 1. In the same super frame the beacon is sent over path 2, so the path quality of path 2 can be monitored. In case that the beacon over path 2 in the super frame no. 1 is received by the receiving device, then in the next super frame no. 2, the data frames are sent over path 2. Likewise, in the super frame no. 2, the beacon is sent over the next path of the path list which in the present example is path 3. Thereby, again it can be checked if path 3 provides good channel qualities or if it is blocked. Again, in case that path 3 provides good channel qualities then the next data frame transmission is accomplished via path 3 and so on. As an alternative, the beacon may not only be sent over a single path but over more paths in order to concurrently monitor several paths.

The advantage of this first embodiment is that no additional time is needed to scan the available paths which increases the maximum data rate.

Figure 8B:
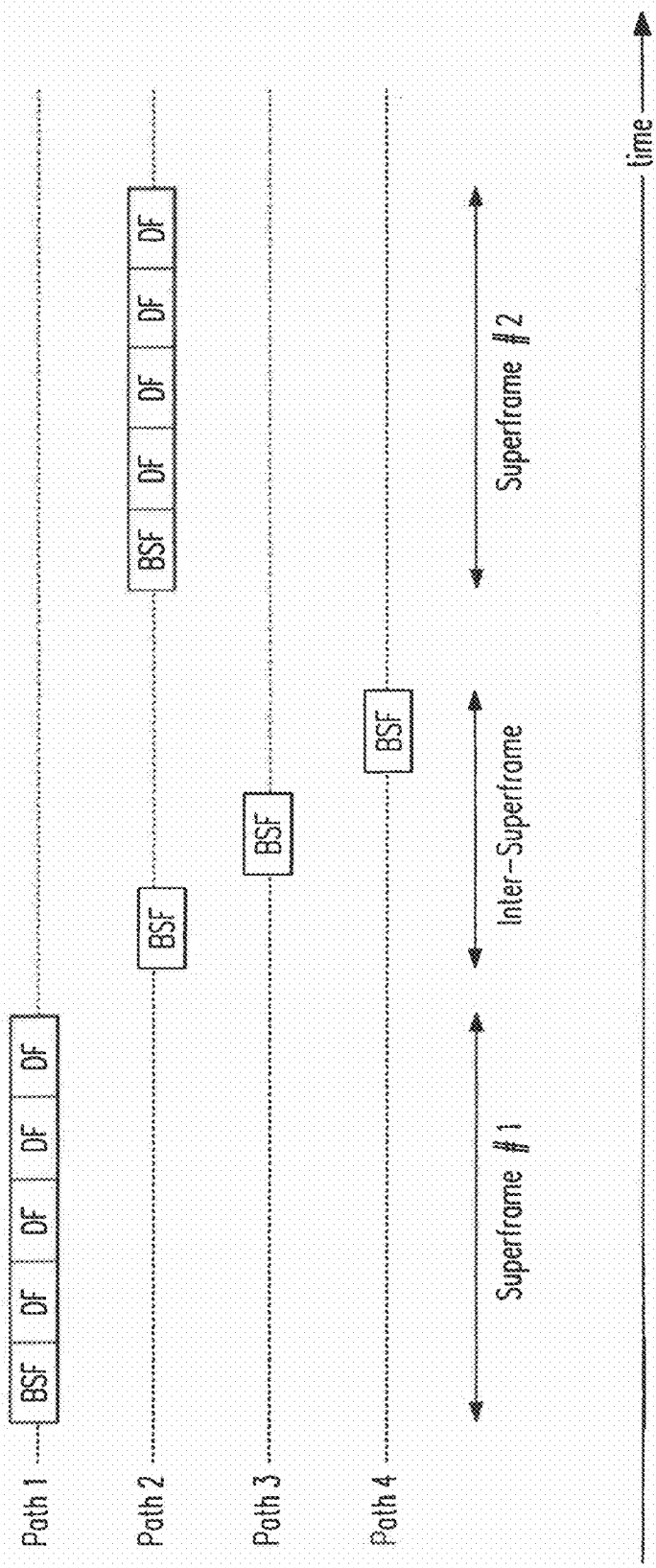

A second embodiment is shown in FIG. 8b. If the transmission of a data frame via one path and simultaneous scanning of an alternative path via the beacon is not possible due to hardware limitations, the monitoring process can be performed between the transmission of subsequent super frames. Hereby, as shown in FIG. 8b, the super frame 1 is entirely sent via path no. 1. Then, between the super frame no. 1 and super frame no. 2 an inter super frame is used where beacons are sent over all other paths in order to monitor the path quality of the other paths. In case that the next path on the path list, in the present example path 2, has good channel qualities, then the next super frame 2 will be sent over path 2.

This scan of all known paths in the inter super frame period in order to determine the path status requires that the receiving device answers immediately via the same path. If the path is blocked, the transmitting device will not receive the reply and drops the path from the next scheduled data transmission.

With the usage of all available paths from the transmitting device 1 to the receiving device 10, the possibility of data lost is decreased. In the simplest case, the distribution of the different frames over the different paths is determined by a round robin scheduling algorithm but also other algorithms may be used. For n available paths, the round robin scheduling reduces the probability of lost frames due to an obstacle in the path to 1/n, if path monitoring is employed simultaneously to the frame transmission.

The invention claimed is:

1. A transmitting device for transmitting signals in a wireless communication system, said signals being transmitted in consecutive frames, each frame comprising a beacon and data frames, said transmitting device comprising:
   a transmitter set of narrow beam antennas, each narrow beam antenna having a different beaming direction corresponding to one of a number of paths from said transmitting device to a receiving device, a set of said number of paths being stored as a list of paths to be used for transmission; and
   a transmitter control unit configured to control a sequence of transmission of each of said frames based on the list of paths to be used for transmission and to update the list of paths to be used for transmission according to a monitored channel quality of the paths of the list of paths, said sequence of transmission including sequential transmission of each of said frames over a respective path of the list of paths in accordance with the stored list of paths.

2. The transmitting device according to claim 1, further comprising
   a beacon generator configured to generate the beacon of each frame for estimating a path quality.

3. The transmitting device according to claim 1, further comprising
   a transmitter memory that stores the list of paths to be used for transmission.

4. The transmitting device according to claim 3, wherein the transmitter control unit is further configured to update the list of paths stored in the transmitter memory depending on a change of path quality.

5. The transmitting device according to claim 4, wherein the transmitter control unit is further configured to remove a path having a decreased path quality from the list of paths stored in the transmitter memory.

6. The transmitting device according to claim 4, wherein the transmitter control unit is further configured to add a path having an increased path quality to the list of paths stored in the transmitter memory.

7. The transmitting device according to claim 1, wherein the transmitter control unit is further configured to send the beacon and the data frames of a frame via different narrow beam antennas.

8. The transmitting device according to claim 1, wherein the transmitter control unit is further configured to send at least one additional beacon between two frames.

9. A receiving device for receiving signals in a wireless communication system, said signals being received in consecutive frames, each frame comprising a beacon and data frames, said receiving device comprising:
   a receiver set of narrow beam antennas, each narrow beam antenna having a different beaming direction corresponding to one of a number of paths from a transmitting device to said receiving device, a set of said number of paths being stored as a list of paths to be used for reception; and
   a receiver control unit configured to control a sequence of reception of each of said frames based on the list of paths to be used for reception and to update the list of paths to be used for reception according to a monitored channel quality of the paths of the list of paths, said sequence of reception including sequential reception of each of said frames over a respective path of the list of paths in accordance with the stored list of paths.

10. The receiving device according to claim 9, further comprising
    a path estimator configured to estimate a path quality based on at least one received beacon.

11. The receiving device according to claim 9, further comprising
    a receiver memory that stores the list of paths to be used for reception.

12. The receiving device according to claim 11, wherein the receiver control unit is further configured to update the list of paths stored in the receiver memory depending on a change of path quality.

13. The receiving device according to claim 12, wherein the receiver control unit is further configured to remove a path having a decreased path quality from the list of paths stored in the receiver memory.

14. The receiving device according to claim 12, wherein the receiver control unit is further configured to add a path having an increased path quality to the list of paths stored in the receiver memory.

15. The receiving device according to claim 9, wherein the receiver control unit is further configured to receive the beacon and the data frames of a frame via different narrow beam antennas.

16. The receiving device according to claim 9, wherein the receiver control unit is further configured to receive at least one additional beacon between two frames.

17. A communication system comprising:
    a transmitting device, including
       a transmitter set of narrow beam antennas, each narrow beam antenna having a different beaming direction corresponding to one of a number of paths from said transmitting device to a receiving device, a set of said number of paths being stored as a list of paths to be used for transmission, and
       a transmitter control unit configured to control a sequence of transmission of each of said frames based on the list of paths to be used for transmission and to update the list of paths to be used for transmission according to a monitored channel quality of the paths of the list of paths to be used for transmission, said sequence of transmission including sequential transmission of each of said frames over a respective path of the list of paths to be used for transmission in accordance with the stored list of paths to be used for transmission; and
    said receiving device, including
       a receiver set of narrow beam antennas, each narrow beam antenna having a different beaming direction corresponding to one of a number of paths from a transmitting device to said receiving device, a set of said number of paths being stored as a list of paths to be used for reception, and
       a receiver control unit configured to control a sequence of reception of each of said frames based on the list of paths to be used for reception and to update the list of paths to be used for reception according to a monitored channel quality of the paths of the list of paths to be used for reception, said sequence of reception including sequential reception of each of said frames over a respective path of the list of paths to be used for reception in accordance with the stored list of paths to be used for reception.

18. A method for transmitting signals in a wireless communication system, said signals being transmitted in consecutive frames, each frame comprising a beacon and data frames, said transmitting method comprising:
- storing a set of a number of paths as a list of paths to be used for transmission, the paths provided by a transmitter set of narrow beam antennas, each narrow beam antenna having a different beaming direction corresponding to one of a number of paths from a transmitting device to a receiving device;
- controlling a sequence of transmission of each of said frames based on the list of paths to be used for transmission, said sequence of transmission including sequential transmission of each of said frames over a respective path of the list of paths in accordance with the stored list of paths; and
- updating the list of paths to be used for transmission according to a monitored channel quality of the paths of the list of paths.

19. The method according to claim 18, said method further comprising
- generating the beacon of each frame for estimating a path quality.

20. The method according to claim 18, said method further comprising
- storing the list of paths to be used for transmission in a transmitter memory.

21. The method according to claim 20, said method further comprising
- updating the list of paths stored in the transmitter memory depending on a change of path quality.

22. The method according to claim 21, said method further comprising
- removing a path having a decreased path quality from the list of paths stored in the transmitter memory.

23. The method according to claim 21, said method further comprising
- adding a path having an increased path quality to the list of paths stored in the transmitter memory.

24. The method according to claim 18, said method further comprising
- sending the beacon and the data frames of a frame via different narrow beam antennas.

25. The method according to claim 18, said method further comprising sending at least one additional beacon between two frames.

26. A method for receiving signals in a wireless communication system, said signals being received in consecutive frames, each frame comprising a beacon and data frames, said receiving method comprising:
- storing a set of a number of paths as a list of paths to be used for reception, the paths provided by a receiver set of narrow beam antennas, each narrow beam antenna having a different beaming direction corresponding to one of a number of paths from a transmitting device to a receiving device;
- controlling a sequence of reception of each of said frames based on the list of paths to be used for reception, said sequence of reception including sequential reception of each of said frames over a respective path of the list of paths in accordance with the stored list of paths; and
- updating the list of paths to be used for reception according to a monitored channel quality of the paths of the list of paths.

27. The method according to claim 26, said method further comprising
- estimating a path quality based on at least one received beacon.

28. The method according to claim 26, said method further comprising storing the list of paths to be used for reception in a receiver memory.

29. The method according to claim 28, said method further comprising
- updating the list of paths stored in the receiver memory depending on a change of path quality.

30. The method according to claim 29, said method further comprising
- removing a path having a decreased path quality from the list of paths stored in the receiver memory.

31. The method according to claim 29, said method further comprising
- adding a path having an increased path quality to the list of paths stored in the receiver memory.

32. The method according to claim 26, said method further comprising
- receiving the beacon and the data frames of a frame via different narrow beam antennas.

33. The method according to claim 26, said method further comprising receiving at least one additional beacon between two frames.

* * * * *